United States Patent [19]

Wyss

[11] Patent Number: 4,840,838

[45] Date of Patent: Jun. 20, 1989

[54] HIGH TEMPERATURE FILTER FELT

[75] Inventor: Kurt H. Wyss, Meyrin, Switzerland

[73] Assignee: E. I. Du Pont de Nemours and Company, Wilmington, Del.

[21] Appl. No.: 270,783

[22] Filed: Sep. 8, 1988

[51] Int. Cl.$^4$ .................... B01D 39/08; B01D 39/16; B32B 5/06; D04B 1/16

[52] U.S. Cl. ...................... 428/234; 28/104; 28/107; 55/527; 55/528; 57/238; 57/239; 57/240; 112/415; 112/416; 210/505; 428/285; 428/286; 428/297; 428/299; 428/300

[58] Field of Search .................. 57/238–240; 28/103–105, 107, 112; 55/527, 528, DIG. 5; 112/400–402, 415, 416; 428/233–235, 285, 286, 297–300; 210/505

[56] References Cited

U.S. PATENT DOCUMENTS

| | | | |
|---|---|---|---|
| 4,324,574 | 4/1982 | Fagan | 55/527 X |
| 4,357,386 | 11/1982 | Luciano et al. | 428/234 |
| 4,361,619 | 11/1982 | Forsten et al. | 428/234 |
| 4,565,735 | 1/1986 | Murka, Jr. et al. | 28/107 X |
| 4,612,237 | 9/1986 | Frankenburg | 28/104 X |

*Primary Examiner*—John Petrakes

[57] ABSTRACT

A high temperature filter felt comprising a scrim and an entangled batt. The machine-direction component of the scrim is made up of intermeshed continuous filament yarns which are 40 to 75% glass fibers and 25 to 60% poly(tetrafluoroethylene) fibers. The fiber of the cross-machine direction component of the scrim is glass, poly(tetrafluoroethylene), aramid, polyacrylate, polyphenylene sulfide or blends of these fibers or the bulked yarn previously described at the machine-direction yarn.

4 Claims, No Drawings

1

HIGH TEMPERATURE FILTER FELT

FIELD OF THE INVENTION

This invention relates to a filter felt suitable for the filtration of particles entrained in high temperature gases.

BACKGROUND OF THE INVENTION

Filter felts which comprise a supporting screen and a batt of staple fibers hydraulically entangled into the scrim are described in Frankenburg U.S. Pat. 4,612,237. In this patent, the staple fibers may be a blend of poly(tetrafluoroethylene) fibers and glass fibers, and the scrim may comprise glass fibers or woven poly(tetrafluoroethylene) yarns or stainless steel, polyamide, or polyphenylene sulfide.

U.S. Pat. No. 4,361,619 to Forsten et al. describes a filter felt made by needling a blend of staple fibers of glass and poly(tetrafluoroethylene) fibers to a scrim of poly(tetrafluoroethylene) fibers.

SUMMARY OF THE INVENTION

The present invention is a filter felt comprising a supporting scrim in which the machine direction component is a bulked continuous filament yarn of glass fiber and poly(tetrafluoroethylene) fiber with batt of staple fibers entangled or needled into the scrim. The filter felts of the present invention have high filtering efficiency and long life when used for the filtration of entrained particles from high temperature gases, but have a light weight per unit area, with the stiffness (modulus) which is usually associated with a filter felt of greater weight per unit area.

The filter felt of this invention may be made by the standard needling techniques common in the industry or by hydraulic entanglement methods which are becoming more common and are described in U.S. Pat. No. 4,612,237.

Because the scrim of the filter felts of this invention has a bulked continuous filament yarn of glass and poly(tetrafluoroethylene) as the machine direction component, the properties of the scrim when needled are not reduced to the same extent during felt manufacture, as a scrim having only glass fibers as the machine direction component. Apparently, the presence of poly(tetrafluoroethylene) component allows the needling to take place with less glass fiber breakage.

The present invention is a filter felt that may be used at temperatures up to 300° C. It comprises a supporting scrim, and a batt of staple fibers entangled or needled into the scrim. The filter felt has a weight per square meter in the range of from about 400 g to about 900 g; an air permeability in the range of about 30 to 400 liters per square decimeter at 20 mm water differential pressure; a tensile strength in the machine and cross direction of the felt of greater than 100 Newtons per 25 mm when measure at 20 degrees C.; a tensile strength of greater than 50 Newtons per 25 mm width in the machine direction and 100 Newtons per 25 mm width in the cross direction when measured at 200 degrees C; an initial modulus in the machine direction greater than 125 Newtons per 25 mm width at 200 degrees C; an elongation of less than 20% when stressed at 50 Newtons per 25 mm width at 200° C.; and an abrasion loss of less than 13 percent by the Martindale abrasion test after 10,000 cycles. The Martindale abrasion test is described in "British Standard Method for Determination of the abrasion Resistance of Fabrics." BS5690:1988.

The supporting scrim has a weight range from 100 to 550 g per square meter, and the machine direction yarn in the scrim comprising an intermeshed continuous filament bulked warp yarn having a linear density in the range from 1,000 to 5,000 dtex, containing from 40 to 75% by weight of glass fibers having a linear density in the range from 0.2 to 2 dtex/filament and 25 to 60% by weight of polytetrafluoroethylene fibers having a linear density in the range from 3 to 10 dtex/filament.

The batt of staple fibers having a weight range from about 300 to 800 g per square meter, the staple filaments of said batt having a linear density from 0.2 to 20 dtex/filament, and being selected from the class consisting of aramids, polytetrafluoroethylene polyphenylene sulfide, polyacrylates, polyketones, polyoxyketones, glass, and blends of the above.

If the scrim is made by weaving, the cross direction yarn is preferably composed of continuous filaments of poly(tetrafluoroethylene) having a linear density of 3 to 10 dtex/filament.

The staple fibers that make up the batt of the filter felt have a length in the range of from about 0.2 to 15 centimeters.

DETAILED DESCRIPTION

The scrim component of the filter felt of the present invention may be woven or knit. In either case, the machine direction yarn component, the warp yarn, of the scrim is an intermeshed continuous filament bulked yarn. This yarn component may be manufactured by the standard techniques known in the industry, for example, the Taslan process or the yarn bulking process described for example in U.S. Pat. No. 2,852,906 to Breen. The warp yarn of the scrim must contain 40 to 75% glass fibers having a linear density in the range of 0.2 to 2 dtex/filament. It is preferred that the glass fibers be the "straight component" in the bulked yarn, i.e., the component that is overfed in a lesser number of linear units to the yarn bulking jet, and thus is less entangled and less loopy than the more highly overfed component.

The other component of the warp yarn of the scrim is poly(tetrafluoroethylene) fibers. This component makes up the complemental amount of the yarn, i.e., 25 to 60% by weight of the yarn. These fibers have a linear density in the range of from about 3 to about 10 dtex/filament. It is preferred that these fibers be the "loopy component" of the bulked yarn, i.e., the fibers that are more highly overfed to the yarn bulking jet, and thus are more entangled and more loopy than the glass fiber component.

The cross-machine component (the fill component) of the scrim is of lesser importance. This component may be the same continuous filament yarn as the machine direction yarn, or it may be another high temperature resistant continuous filament yarn; for example, it may be made of glass fibers, aramid fibers, poly(tetrafluoroethylene) fibers, polyacrylate fibers, polyphenylene sulfide fibers, or blends of these fibers.

The cross-machine yarn has a linear density in the range of 150 to 5000 dtex. The fibers that make up this yarn should have a linear density of about 0.2 to 10 dtex/filament.

The batt of staple fibers that are entangled into the scrim to form the filter felt of the invention is made up of fibers having a linear density of from about 0.2 to about 20/dtex/filament. The fibers are relatively stable at the temperature at which the felt will be used and selected from the class consisting of aramids, poly(tetrafluoroethylene), polyphenylene sulfide, polyacrylates, polyketones, polyoxyketones, glass, and blends of the above. The batt of staple fibers has a weight in the range of about 300 to 800 grams per square meter. Preferably the fibers of the batt have a length of about 0.2 to 15 centimeters, and most preferably 2.5 to 15 centimeters.

The scrim may be prepared by the conventional weaving process, or by a knitting process (warp knitting).

EXAMPLES

EXAMPLE 1

A bulked continuous filament yarn was produced by feeding a 1330 dtex polytetrafluoroethylene yarn and a 1360 dtex glass yarn to a ELTEC Texturing Machine. The polytetrafluoroethylene yarn was fed at 132 meters per minute, and the glass yarn was fed at 115.50 meters per minute. The pressure in the interlacing jet was set at 5 bar, and the air consumption was 10 cubic meters per hour. The yarn was wound up at a speed of 111 meters per minute. The bulked yarn had a linear density of about 3100 dtex.

A fabric (scrim) was made by weaving this yarn as both the machine and cross-machine direction component. The fabric had a basis weight of 260 g per square meter. (loom state) and 290 g per square meter after heat setting in the felt.

A batt of a blend of 76% by weight of polytetrafluoroethylene staple fibers having a length of about 10 cm and a linear density of 7.4 dtex, and 24% by weight glass fibers having a length of about 5 cm and a linear density of about 0.2 dtex was needled into the scrim, in accordance with the process described in U.S. Pat. No. 4,361,619. The batt weighed 407 g per square meter. The resulting product after heat setting at 290° to 300° C., had a thickness of about 2.29 mm, an air permeability of 239 liters per square decimeter per minute, measured at 20 mm of water differential pressure. The product (the filter felt) had a tensile strength in the machine direction of 149 Newtons, and a tensile strength in the cross-machine direction of 325 Newtons, per 25 mm width when measured at 25° C.; and a tensile strength in the machine direction of 75 Newtons and a tensile strength in the cross-machine direction of 176 per 25 mm width when measured at 200° C. The felt had an initial modulus (machine direction) of 303 when measured at 200° C. and elongated 19.2% when stressed at 50 Newtons per 25 mm width at 200° C.; and 43.3 % elongation when stressed at 75 Newtons per 25 mm width at 200° C.

The filter felt was tested for abrasion resistance using a Martindale tester. After 10,000 cycles it had a weight loss of 11.5%.

The filter felt was tested in laboratory equipment for filtration efficiency in accordance with the procedure set forth in U.S. Pat. No. 4,361,619 (except that the gas velocity was 1.7 m/minute). The filter had a leakage of 11 mg per cubic meter of gas that passed through the filter.

EXAMPLE 2

Using the bulked continuous filament yarn prepared in accordance with example 1, a scrim was prepared using a commercial warp knitting process. The scrim had a weight of 505 g per sq meter. A batt of glass and polytetrafluoroethylene fibers similar to that employed in example 1 having a weight of 314 g per sq meter was needled into the scrim. After heat setting the filter felt had a thickness of 2.33 mm, and an air permeability of 187.2 liters per sq decimeter per minute at 20 mm of water differential pressure. The felt had a tensile strength in the machine direction of 266 Newtons for 25 mm of width at 25° C. and a cross-machine tensile strength of between 349 and 403 Newtons for 25 mm of width, when measured at 25° C. At 200° C. the tensile strength was 197 Newtons in the cross-machine direction, and 171 Newtons in the machine direction, when measured at 25 mm width. The initial modulus of the felt was 564 Newtons per 25 mm width.

When tested for abrasion resistance using a Martindale tester, the sample had a weight loss of 11.0% after 10,000 cycles.

This filter felt was tested in the laboratory as in Example 1 and found to have a leakage of 4.5 mg per cubic meter of gas that passed through the filter.

EXAMPLE 3

Using a bulked yarn of glass and polytetrafluoroethylene, prepared in accordance with Example 1, as the machine direction yarn, and polytetrafluoroethylene yarn as the cross-machine direction yarn, a suitable scrim was produced.

The scrim weighed 185 g per square meter. A batt that weighed 350 g per square meter similar to that employed in Example 1 was needled to the scrim, and the product was heat set.

After heat setting, the product weighed 631 g per square meter. The resulting product had an air permeability of 282 liters per square decimeter per minute, measured at 20 mm of water differential pressure. The product (the filter felt) had a tensile strength in the machine direction of 145 Newtons, and a tensile strength in the cross-machine direction of 287 Newtons, per 25 mm width when measured at 25° C.; and a tensile strength in the machine direction of 61 Newtons and a tensile strength in the cross-machine direction of 105 Newtons per 25 mm width when measured at 200° C.

The filter felt was tested for abrasion resistance using a Martindale tester. After 10,000 cycles it had a weight loss of 11.3%.

EXAMPLE 4

Using a suitable scrim, such as the one produced in Example 1, a batt of waterleaf fibers may be attached by hydraulic needling. Example 2 of U.S. Pat. No. 4,569,088 shows a suitable technique to make the waterleaf batt. Using this technique, but using as the fibers of the batt 11.8 g of 6.4 mm long polytetrafluoroethylene fibers having a linear density of 7.4 dtex and 4.6 g of 6.4 mm long glass fibers having a linear density of 0.2 dtex, a waterleaf was prepared.

The waterleaf batt was then hydraulically needled to the scrim. A satisfactory filter felt was obtained.

We claim:
1. A filter felt suitable for long term use at temperatures up to 300° C., comprising a supporting scrim and a batt of staple fibers entangled into the scrim,
    said filter felt having a weight per square meter in the range from 400 g to 900 g; an air permeability in the range from 30 to 400 liters per square decimeter per minute at 20 mm water differential pressure; a tensile strength in the machine and cross-direction of greater than 100 Newtons per 25 mm width when measured at 25° C.; and tensile strengths of greater than 50 Newtons per 25 mm width in the machine direction and 100 Newtons per 25 mm width in the cross-direction when measure at 200° C.; an initial modulus in the machine direction greater than 125 Newtons per 25 mm width at 200° C., and an elongation of less than 20% when stressed at 50 Newtons per 25 mm width at 200° C.; an abrasion weight loss of less than 13 percent by the Martindale abrasion test after 10,000 cycles.

said supporting scrim having a weight range from 100 to 550 g per square meter, said supporting scrim comprising an intermeshed continuous filament bulked (machine direction) yarn having a linear density in the range from 1,000 to 5,000 dtex, containing from 40 to 75% by weight of glass fibers having a linear density in the range from 0.2 to 2 dtex/filament and 25 to 60% by weight of poly(tetrafluoroethylene) fibers having a linear density in the range from 3 to 10 dtex/filament, and a cross-machine direction continuous filament yarn having a linear density in the range of 150 to 5,000 dtex and selected from the class consisting of glass, aramid, poly(tetrafluoroethylene), polyacrylate, polyphenylene sulfide or blends of these fibers or the bulked yarn previously described as the machine direction yarn, said batt of staple fibers having the weight range from about 300 to 800 g per square meter, the staple fibers of said batt having a linear density from 0.2 to 20 dtex/filament, and being selected from the class consisting of aramids, poly(tetrafluoroethylene), polyphenylene sulfide, polyacrylates, polyketones, polyoxyketones, glass, and blends of the above.

2. The filter felt of claim 1 in which the scrim is knit and the fill (cross-direction) yarn is composed of continuous filaments of poly(tetrafluoroethylene) having a linear density from 3 to 10 dtex/filament.

3. The filter felt of claim 1 in which the scrim is knit and the fill (cross-direction) yarn is composed of continuous filaments of glass having a linear density from 0.2 to 2.0 dtex/filament.

4. The filter felt of claim 1 in which the staple fibers of the batt have a length in the range from 2.5 to 15 centimeters.

* * * * *